(12) United States Patent
Divan

(10) Patent No.: US 6,585,271 B2
(45) Date of Patent: Jul. 1, 2003

(54) SEAL MEMBER, ASSEMBLY, AND METHOD

(75) Inventor: Patrick N. Divan, Spearfish, SD (US)

(73) Assignee: Halliburton Energy Services, Inc., Duncan, OK (US)

( * ) Notice: Subject to any disclaimer, the term of this patent is extended or adjusted under 35 U.S.C. 154(b) by 7 days.

(21) Appl. No.: 09/918,998

(22) Filed: Jul. 31, 2001

(65) Prior Publication Data

US 2003/0025280 A1 Feb. 6, 2003

(51) Int. Cl.[7] .............................................. F16T 15/16
(52) U.S. Cl. ........................ 277/543; 277/547; 277/603; 277/616; 277/903
(58) Field of Search ............................... 277/903, 543, 277/545–547, 906, 603, 626, 615, 616; 432/115

(56) References Cited

U.S. PATENT DOCUMENTS

| | | | | |
|---|---|---|---|---|
| 1,891,436 A | * | 12/1932 | Michell | 277/546 |
| 2,348,587 A | * | 5/1944 | Antonelli | 277/507 |
| 3,383,115 A | * | 5/1968 | Eckley et al. | 277/402 |
| 3,472,540 A | * | 10/1969 | Gottschald | 277/504 |
| 3,528,668 A | * | 9/1970 | Barton | 277/606 |
| 3,940,239 A | | 2/1976 | Rossi et al. | 432/115 |
| 3,948,531 A | * | 4/1976 | Mitrani | 277/543 |
| 4,111,439 A | | 9/1978 | Schmidt | |
| 4,154,546 A | * | 5/1979 | Merrick et al. | 277/635 |
| 4,193,756 A | | 3/1980 | Leon | 432/3 |
| 4,295,824 A | | 10/1981 | Wens | 432/115 |
| 4,338,080 A | | 7/1982 | Grandcolas et al. | 432/115 |
| 4,342,555 A | | 8/1982 | Bohanszky | 432/115 |
| 4,399,999 A | * | 8/1983 | Wold | 277/546 |
| 4,400,154 A | * | 8/1983 | Lientz | 277/562 |
| 4,405,137 A | | 9/1983 | Webb | |
| 4,433,848 A | * | 2/1984 | Williams | 277/547 |
| 4,502,702 A | * | 3/1985 | Nixon, Jr. | 277/545 |
| 4,543,061 A | | 9/1985 | Edwards | |
| 4,545,764 A | | 10/1985 | Gillies et al. | 432/115 |
| 4,554,748 A | * | 11/1985 | Nixon, Jr. | 277/545 |
| 4,558,869 A | * | 12/1985 | Grove et al. | 156/308.6 |
| 4,811,961 A | * | 3/1989 | Williams | 277/545 |
| 4,961,588 A | | 10/1990 | Brienza | |
| 5,100,158 A | * | 3/1992 | Gardner | 277/411 |
| 5,106,105 A | | 4/1992 | Drexler | |
| 5,174,750 A | * | 12/1992 | Flading et al. | 110/246 |
| 5,383,672 A | * | 1/1995 | Cornelius | 277/553 |
| 5,551,870 A | | 9/1996 | Gale | 432/115 |
| 5,571,269 A | | 11/1996 | Buelow | |
| 5,823,768 A | | 10/1998 | Blasiole et al. | 432/115 |

OTHER PUBLICATIONS

IGS Sealing Technology Group brochure entitled "Rotary Sealing Systems for Calciners, Coolers, Dryers and Kilns";—undated but admitted to be prior art.
Philips Kiln brochure entitled "The Philips Kiln Enviro Seal";—undated but admitted to be prior art.

* cited by examiner

*Primary Examiner*—Anthony Knight
*Assistant Examiner*—Alison K. Pickard
(74) *Attorney, Agent, or Firm*—Craig W. Roddy; Warren B. Kice

(57) ABSTRACT

A seal assembly and method according to which a plurality of seal members are provided, each of which is formed by a strip of material having two interlocking portions. One of the interlocking portion of each seal member interlocks with one interlocking portion of another seal member, and the other interlocking portion of the each seal member interlocks with one interlocking portion of another seal member.

7 Claims, 4 Drawing Sheets

SEAL MEMBER, ASSEMBLY, AND METHOD

BACKGROUND

This disclosure relates generally to a seal member, an assembly of seal members, and a sealing method, all for the purpose of sealing against the ingress of air through a joint between two components.

Seals are often employed with drying equipment in which air and moisture-laden materials are passed through the length of a dryer tube to dry the materials. The discharge end of the dryer tube usually extends through an opening in an enclosure that contains a screw conveyor, or the like, for receiving the dried material from the dryer tube and passing the material to other equipment. Seals are often provided at the joint between the discharge end of the dryer tube and the enclosure to prevent the ingress of "tramp" air into the enclosure via the opening.

However, existing seals of this type are often very complicated and expensive and often are fabricated from stainless steel which further increases the cost.

Therefore, what is needed is an air seal of the above type which is simple in design, easy to install, and relatively inexpensive.

SUMMARY

According to an embodiment of the present invention a plurality of seal members are provided, each of which is formed by a strip of material having two interlocking portions. One of the interlocking portions of each seal member interlocks with an interlocking portion of another seal member, and the other interlocking portion of each seal member interlocks with an interlocking portion of still another seal member.

DETAILED DESCRIPTION

Figure 1:
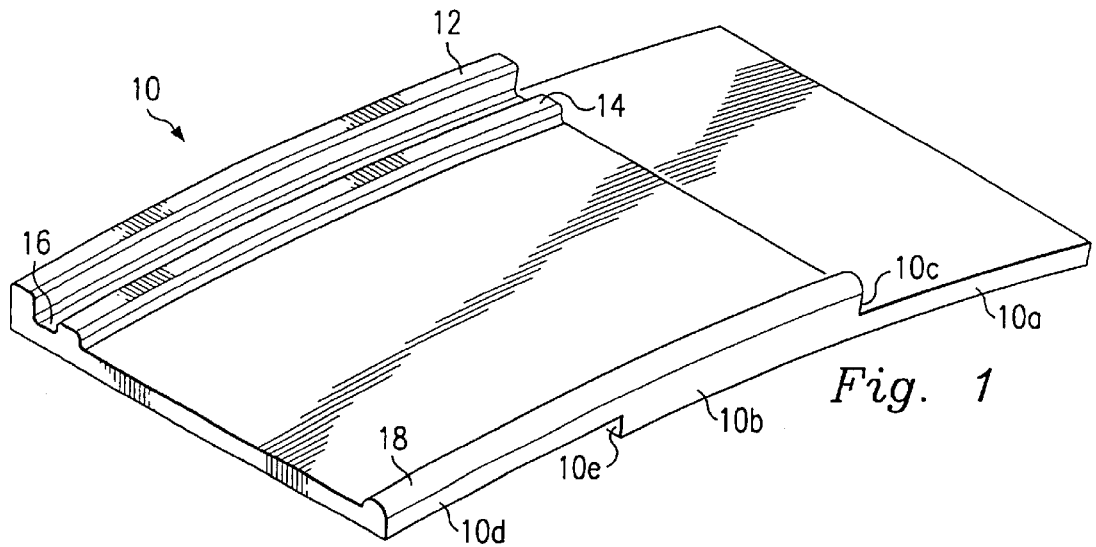
FIG. 1 is an isometric view of a seal member according to an embodiment of the present invention.

Referring to FIG. 1 of the drawings, the reference numeral 10 refers, in general, to a seal member according to an embodiment of the present invention. The seal member 10 is fabricated from an arcuate strip of flexible material, such as an urethane, which for the purpose of example, can be a 85 durometer urethane. The seal member varies in its radial dimension, or thickness, along its length to form a stepped cross section. More particularly, the seal member 10 includes a first section 10a having a relatively small radial dimension, a second section 10b extending from the section 10a and having a relatively large radial dimension which extends, or projects radially outwardly from the section 10a to form a shoulder 10c. The radial inner surfaces of the sections 10a and 10b are coextensive. A third section 10d extends from the section 10b, and its radial outer surface is coextensive with the radial outer surface of the section 10b. The radial inner surface of the section 10d is stepped radially outwardly from the radial inner surface of the section 10b to form a shoulder 10e. The sections 10b and 10d are formed integrally with section 10a.

A rib 12 is formed along one marginal edge portion of the sections 10b and 10d and projects radially outwardly from the latter sections. A rib 14 is also formed on the sections 10b and 10d and projects radially outwardly from the latter sections and in a spaced relation to the rib 12 to define a spring seat 16 therebetween. A flange 18 is formed along the opposite marginal edge portion of the sections 10b and 10d and projects radially outwardly from the latter sections. The ribs 12 and 14 and the flange 18 are formed integrally with the strip 10.

Figure 2:
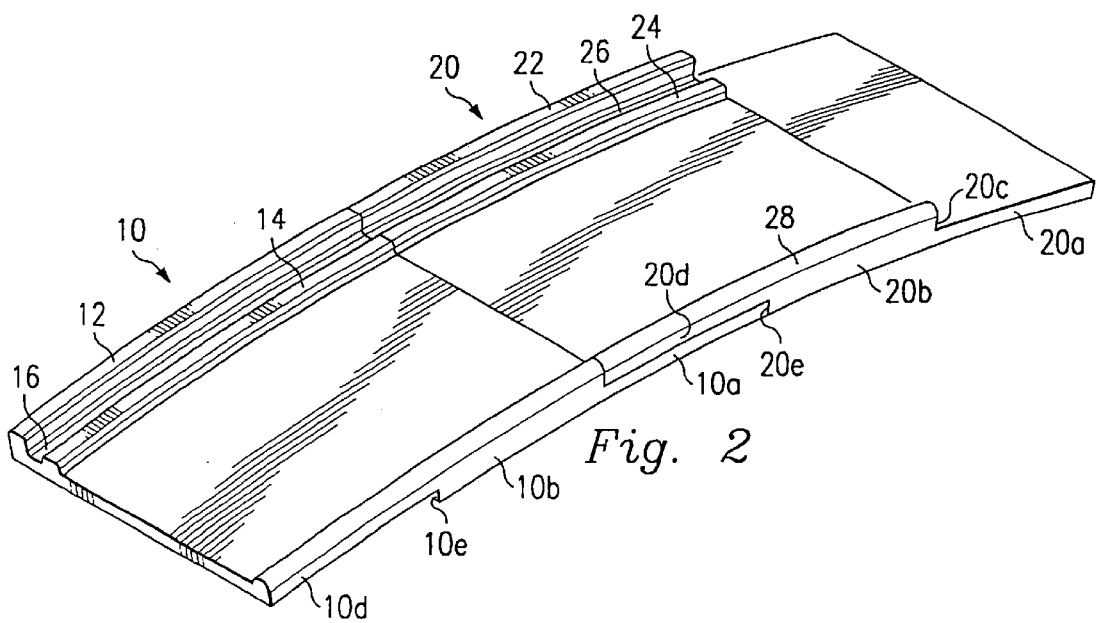
FIG. 2 is an isometric view of the seal member of FIG. 1 shown in an interlocked position with another identical seal member.

FIG. 2 depicts the seal member of 10 interlocked with a seal member 20 which is identical to the seal member 10. Thus, the seal member 20 is fabricated from an arcuate strip of flexible material such as polythene which includes a first section 20a having a relatively small radial dimension, a second section 20b extending from the section 20a and having a relatively large cross section which extends, or projects radially outwardly from the section 20a to form a shoulder 20c. The radial inner surfaces of the sections 20a and 20b are coextensive. A third section 20d extends from the section 20b and its radial outer surface is coextensive with the radial outer surface of the section 20b. The radial inner surface of the section 20c is stepped radially outwardly from the radial inner surface of the section 20a to form a shoulder 20e. The sections 20a, 20b and 20c are formed integrally.

A rib 22 is formed along one marginal edge portion of the sections 20b and 20c and projects radially outwardly from the latter sections; and a rib 24 is also formed on the sections 20b and 20c and projects radially outwardly from the latter sections and in a spaced relation to the rib 24 to define a spring seat 26 therebetween. A flange 28 is formed along the opposite marginal edge portion of the sections 20b and 20c and projects radially outwardly from the latter sections. The ribs 24 and 26 and the flange 28 are formed integrally with the strip 20.

The members 10 and 20 are interlocked by placing the distal end of the section 20d of the member 20 against the shoulder 10c of the member 10, and the distal end of the section 10a of the member 10 against the shoulder 20e of the member 20. In this interlocked position, the radial inner surface of the section 20d engages the corresponding radial outer surface of the section 10a.

The arcuate length of the assembly of seal members thus formed can be extended by adding other seal members identical to the seal members 10 and 20. In this case the seal member 10 would be connected to another identical seal member (not shown) in the same manner as described above, with the distal end of the corresponding section of the other seal member engaging the shoulder 10e of the member 10. Still another seal member (not shown) can be connected to the seal member 20 in the same manner, with the distal end of the corresponding section of the latter other seal member engaging the shoulder 20c of the member 20. According to an embodiment of the present invention, the number of seal members that are assembled in the above manner are such that a complete ring is formed, as will be discussed in detail later.

Figure 3:
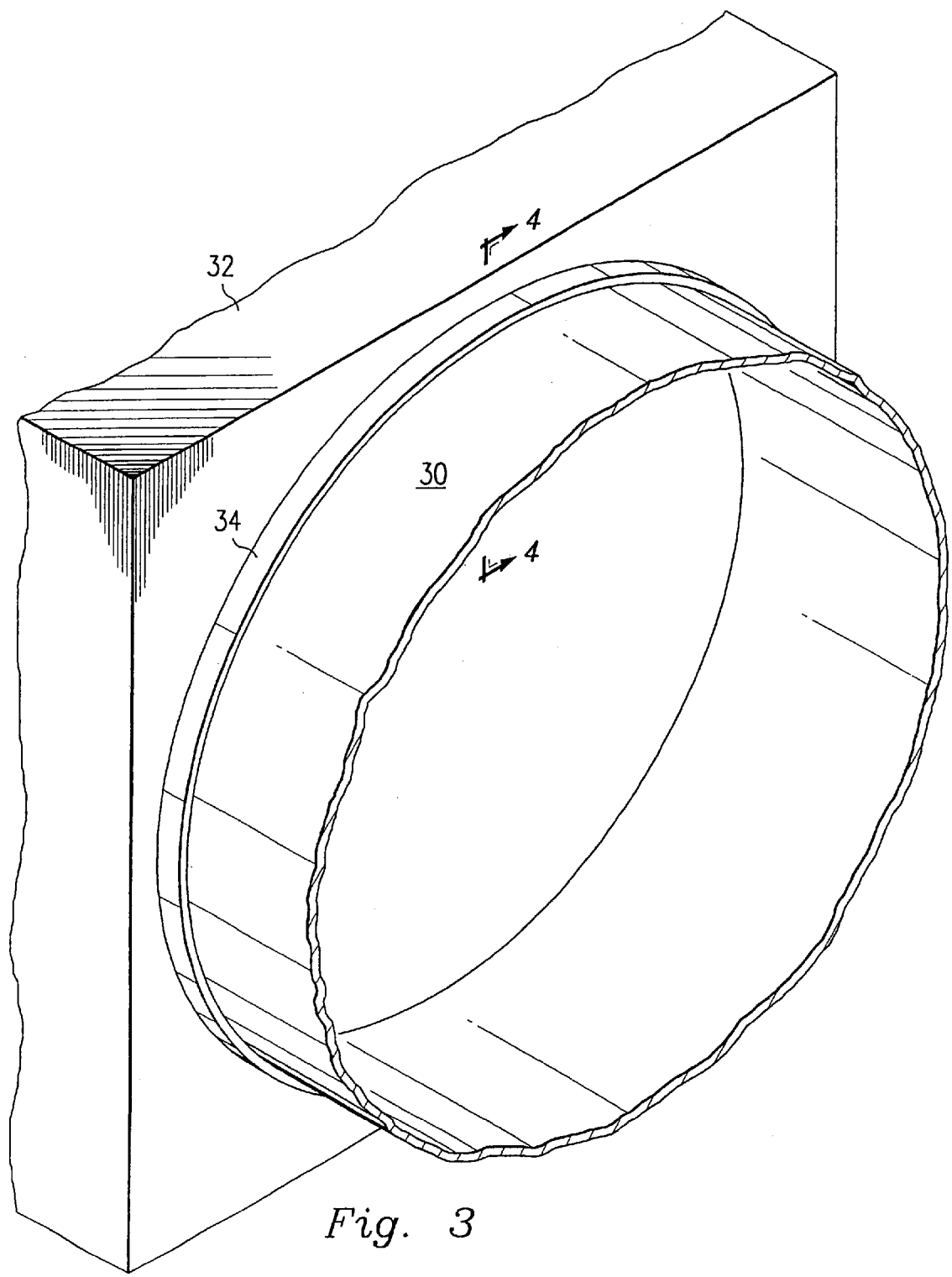
FIG. 3 is a partial isometric view of a dryer tube shown connected to an enclosure.
Figure 4:
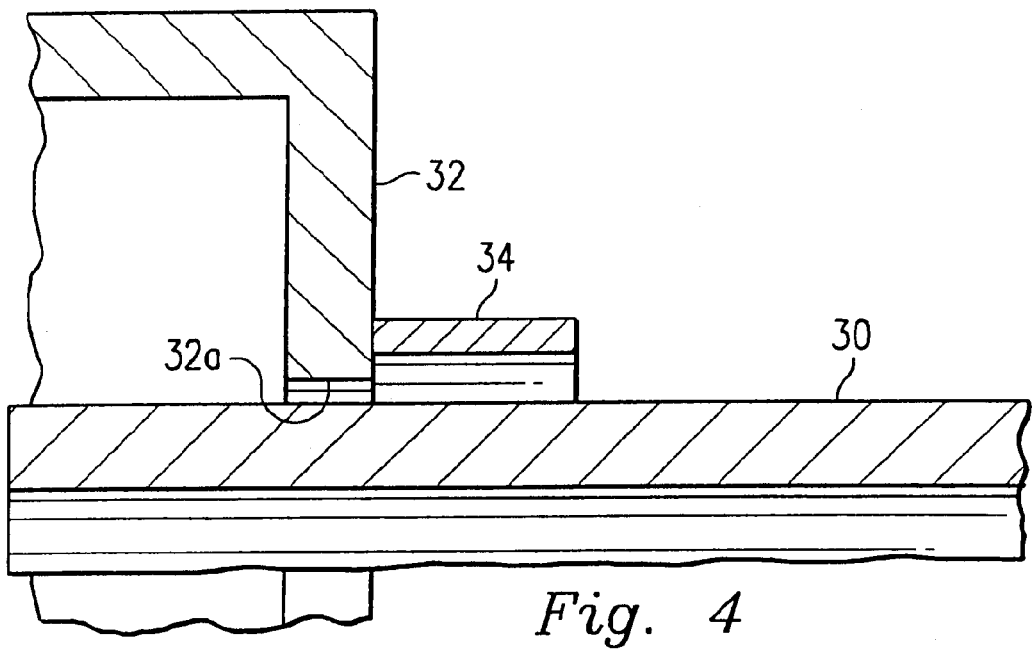
FIG. 4 is a cross-sectional view taken along the line 4—4 of FIG. 3.

FIGS. 3 and 4 depict the lower, or discharge, end portion of a dryer tube 30 that cooperates with an enclosure 32 and extends through an opening 32a (FIG. 4) in the enclosure 32. A support ring 34 is affixed to the outer surface of the enclosure 32 in any conventional manner, and surrounds the opening 32a. The function of the support ring 34 will be described later. Moisture-laden particulate material is introduced into the other end (not shown) of the dryer tube 30 and is passed through the length of the tube to dry the material before it is discharged into the interior of the enclosure 32. The enclosure 32 usually contains a screw conveyor, or the like, (not shown) for receiving the dried material from the dryer tube 30 and passing the material to another location.

Figure 6:
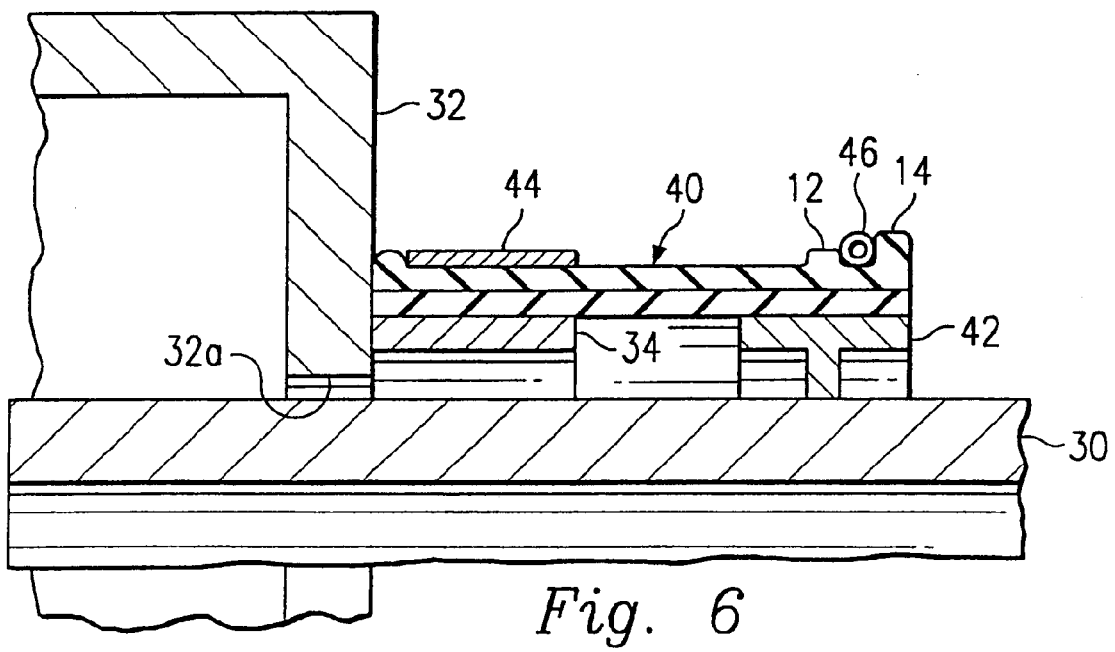
FIG. 6 is a cross-sectional view taken along the line 6—6 of FIG. 5.
Figure 5:
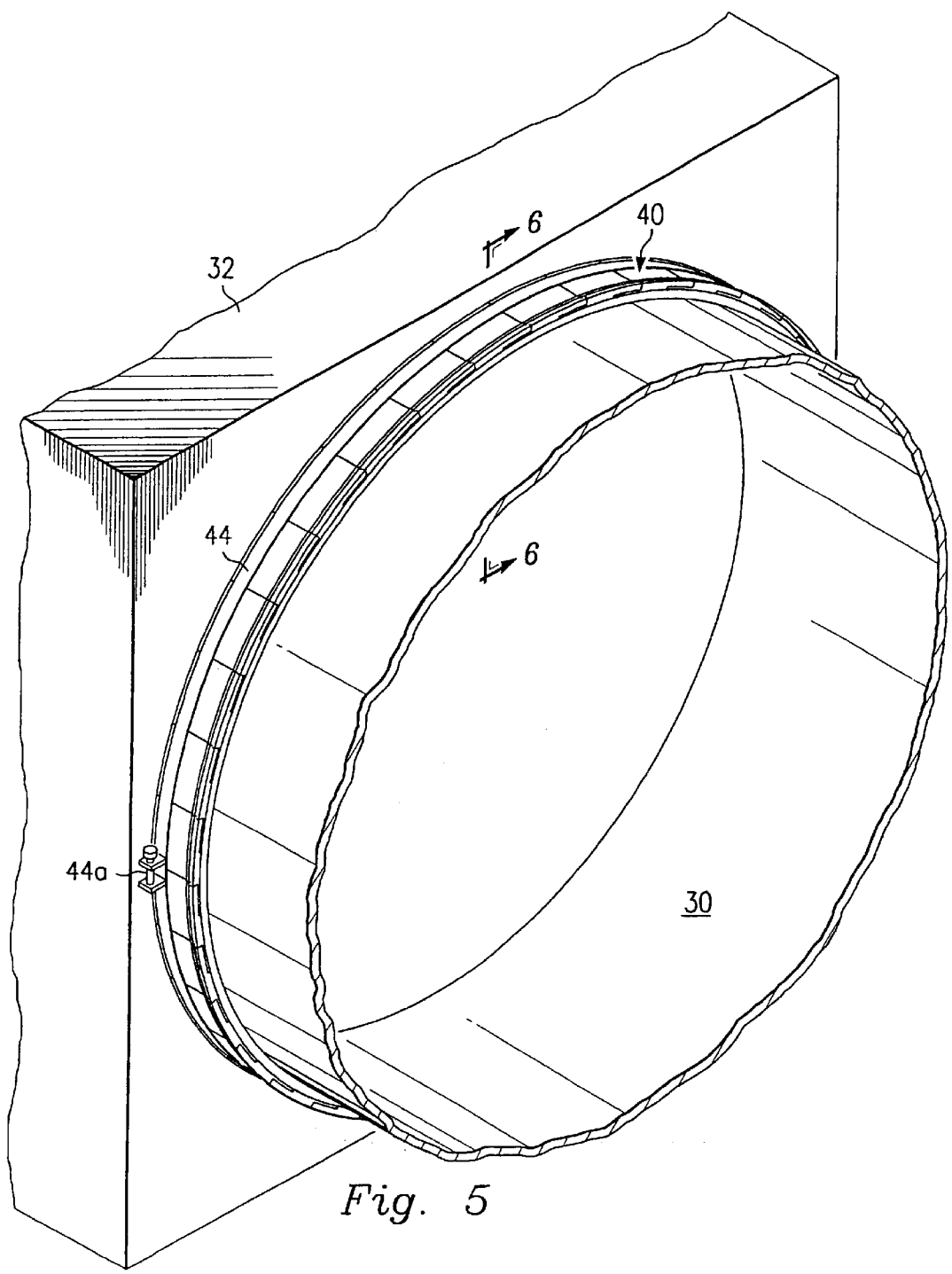
FIG. 5 is a view, similar to FIG. 3, but depicting a seal assembly installed on the dryer tube of FIG. 3.

FIGS. 5 and 6 depict a seal assembly 40 which is formed by a series of interlocked seal members that are identical to the seal members 10 and 20, and which extends around the outer circumference of the dryer tube 30. The assembly 40 functions to seal against the ingress of air through the interface between the discharge end of the dryer tube 30 and the opening 32a in the enclosure 32. To this end, the assembly 40 is mounted adjacent the discharge end of the dryer tube 30 with a portion of the inner radial surface of the assembly extending over, and being supported by, the support ring 34. The above first-mentioned marginal edge portions of the seal members 10 and 20, as well as those of the remaining seal members in the assembly 40, abut the corresponding outer surface of the enclosure 32.

As better shown in FIG. 6, a support flange 42, having a T-shaped cross section, is mounted to the outer surface of the dryer tube 30 in any conventional manner and extends in a spaced relation to the support ring 34. The outer radial surface of the flange 42 is aligned with the outer radial surface of the ring 34 and supports another portion of an inner radial surface of the seal assembly 40.

A ring-shaped bracket 44 is placed over an axial portion of the assembly 10 including the flanges 18 and 28 of the seal members 10 and 20, respectively, and the corresponding flanges of the remaining seal members. The bracket 44 extends around the entire circumference of the latter portion of the seal assembly 40, and a conventional clamp 44a (FIG. 5) is mounted to the respective end portions of the bracket and secures the bracket in place. As a result, the bracket 44 urges the corresponding portion of the seal assembly 40 into engagement with the support ring 34.

The remaining axial portion of the assembly 40, including the ribs 12 and 14 of the seal member 10 (shown in FIG. 6), the ribs 22 and 24 of the seal member 20, as well as those of the remaining seal members, are not engaged by the bracket 44. A ring-shaped spring 46 is placed in the seats 16 and 26 of the seal members 10 and 20, respectively, and the other seal members of the seal assembly 40. The spring 46 extends for the entire circumference of the seal assembly 40 and is sized so as to apply a spring-loaded force to the assembly to force the corresponding portion of each seal ring into engagement with the support flange 42. Thus, a strong and effective seal against the ingress of air into the enclosure opening 32a is established.

In addition to installing the seal assembly 40 on the lower, or discharge, end portion of the dryer tube 30, it is understood that another seal assembly could be installed on the upper, or inlet end portion of the dryer tube.

The seal members and the seal assembly of the above embodiments establish a superior seal yet are are simple in design, easy to manufacture and install, and relatively inexpensive.

It is understood that variations may be made in the foregoing without departing from the scope of the invention. For example, the seal members disclosed above can be fabricated of any material consistent with the purpose of the invention. Also, the number of seal members used in a particular assembly can vary within the scope of the invention. Further, the expression "tube" is meant to cover other similar structure, such as conduits, pipes, ducts, etc., and the seal members and seal assembly can be used for sealing gases and liquids.

Since other modifications, changes, and substitutions are intended in the foregoing disclosure, it is appropriate that the appended claims be construed broadly and in a manner consistent with the scope of the invention.

What is claimed is:

1. A seal assembly comprising:
   a plurality of seal members, each comprising a strip of material having two interlocking portions, one of the interlocking portions of each seal member interlocking with one interlocking portion of another seal member, and the other interlocking portion of each seal member interlocking with one interlocking portion of another seal member;
   a pair of ribs projecting from a surface of each strip to define a seat, one of the ribs being located along one marginal edge portion of the strip, and the other rib being disposed in a spaced relation to the one rib;
   a ring-shaped spring member extending in the seat to apply a sealing pressure to the seal members to urge them into a sealing engagement with a surface over which they extend;
   a flange projecting from the surface of the other marginal edge portion of each strip, and
   a bracket extending over the flange to urge the seal member into a sealing engagement with the surface.

2. The assembly of claim 1 wherein each seal member is arcuate in shape, and wherein the interlocking seal members form a ring.

3. The assembly of claim 1 wherein each seal member comprises a first, second and third section, wherein the radial inner surfaces of the first and second sections are coextensive, and wherein the second section is stepped to extend radially outwardly from the first section to form one of the interlocking members.

4. The assembly of claim 3 wherein the radial outer surface of the third section is coextensive with the radial outer surface of the second section, and wherein the radial inner surface of the third section is stepped to extend radially outwardly from the radial inner surface of the second section to form the other interlocking member.

5. A method of sealing between a tubular member and an opening in an enclosure comprising:
   interlocking one portion of a first seal member with an interlocking portion of a second seal member, and interlocking another portion of the first seal member with an interlocking portion of a third seal member to form a ring extending around an outer surface portion of the tubular member;
   inserting a spring member in a seat defined by a pair of ribs projecting from the seal members to apply a sealing pressure to the seal members and urge the seal members into a sealing engagement with the outer surface portion of the tubular member; and
   placing a bracket over a flange projecting from the seal members to urge the sealing members into a sealing engagement with a surface of the enclosure surrounding the opening.

6. The method of claim 5 further comprising disposing one of the ribs along the marginal edge portion of the seal members, and disposing the other rib in a spaced relation to the one rib.

7. The method of claim 6 further comprising disposing the flange along the other marginal edge portion of the seal members.

* * * * *